United States Patent [19]

Saucier et al.

[11] Patent Number: 5,605,431

[45] Date of Patent: Feb. 25, 1997

[54] LOCKING WHEELCHAIR LIFT

[75] Inventors: Stanton D. Saucier, Tarzana, Calif.; Pierre Savaria, St-Eustache; Jules Tremblay, Sunland, both of Canada; Nelson Tremblay, Woodland Hills, Calif.

[73] Assignee: Ricon Corporation, Pacoima, Calif.

[21] Appl. No.: 692,979

[22] Filed: Aug. 7, 1996

Related U.S. Application Data

[63] Continuation of Ser. No. 485,238, Jun. 6, 1995, abandoned, which is a continuation of Ser. No. 114,774, Aug. 31, 1993, Pat. No. 5,445,488, which is a continuation-in-part of Ser. No. 920,796, Jul. 28, 1992, Pat. No. 5,308,215.

[51] Int. Cl.$^6$ .................................................. B60P 1/44
[52] U.S. Cl. ............................................................ 414/546
[58] Field of Search .................................. 414/546, 917, 414/921, 556–558

[56] References Cited

U.S. PATENT DOCUMENTS

| | | | |
|---|---|---|---|
| 2,470,778 | 5/1949 | Lankovski et al. | 414/546 |
| 2,500,815 | 3/1950 | Gerli et al. | 414/917 X |
| 3,415,161 | 12/1968 | Mindrum | 91/32 X |
| 3,764,030 | 10/1973 | Randall | 414/556 |
| 4,124,100 | 11/1978 | Hawks | 414/540 |
| 4,400,938 | 8/1983 | Ohe | 91/31 X |
| 4,474,527 | 10/1984 | Risner et al. | 414/921 X |
| 4,534,450 | 8/1985 | Savaria | 414/921 X |
| 4,583,907 | 4/1986 | Wimberley | 414/917 X |
| 4,664,584 | 5/1987 | Braun et al. | 414/921 X |
| 4,711,613 | 12/1987 | Fretwell | 414/558 X |
| 4,715,264 | 12/1987 | Stoll | 91/31 X |
| 4,783,043 | 11/1988 | Koerber | 91/31 X |
| 4,808,056 | 2/1989 | Oshima | 414/921 X |
| 4,821,622 | 4/1989 | Burk | 91/31 X |
| 4,917,001 | 4/1990 | Yoshikawa et al. | 91/31 X |
| 4,984,955 | 1/1991 | McCullough | 414/921 X |
| 5,110,252 | 5/1992 | Aoki | 414/921 X |
| 5,142,963 | 9/1992 | Piekutowski | 91/31 |
| 5,180,275 | 1/1993 | Czech et al. | 414/921 X |
| 5,228,538 | 7/1993 | Tremblay | 414/921 X |
| 5,261,779 | 11/1993 | Goodrich | 414/921 X |
| 5,308,215 | 5/1994 | Saucier | 414/546 |

FOREIGN PATENT DOCUMENTS

WO92/14431 9/1992 WIPO.

*Primary Examiner*—David A. Bucci
*Attorney, Agent, or Firm*—Darby & Darby, P.C.

[57] ABSTRACT

A wheelchair lift, as for use with a vehicle, includes a platform for receiving a wheelchair carried as a pivot mechanism including two pairs of cooperating parallelogram structures adopted to be affixed to a vehicle for moving the platform between loading, entry and stowed positions by hydraulic actuation. A bridge plate structure is actuated by the pivot mechanism to be positioned as a bridge into the vehicle in the entry position, as a roll stop when a wheelchair is being carried and as a latch unit in the stowed position. A cam-cable mechanism actuates the bridge plate and the parallelogram structures of each pair are interlocked in moving between the stowed and entry positions.

9 Claims, 6 Drawing Sheets

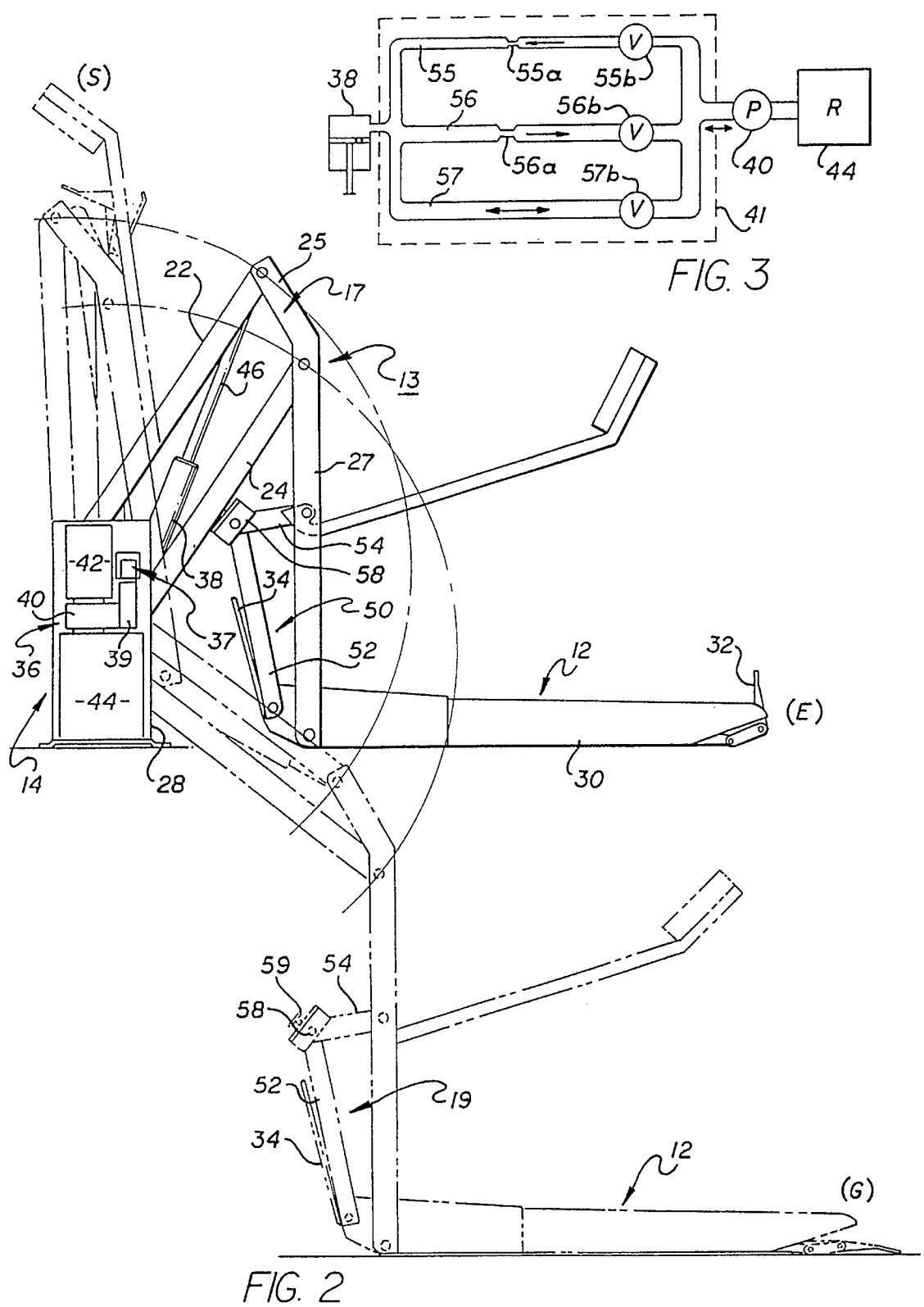

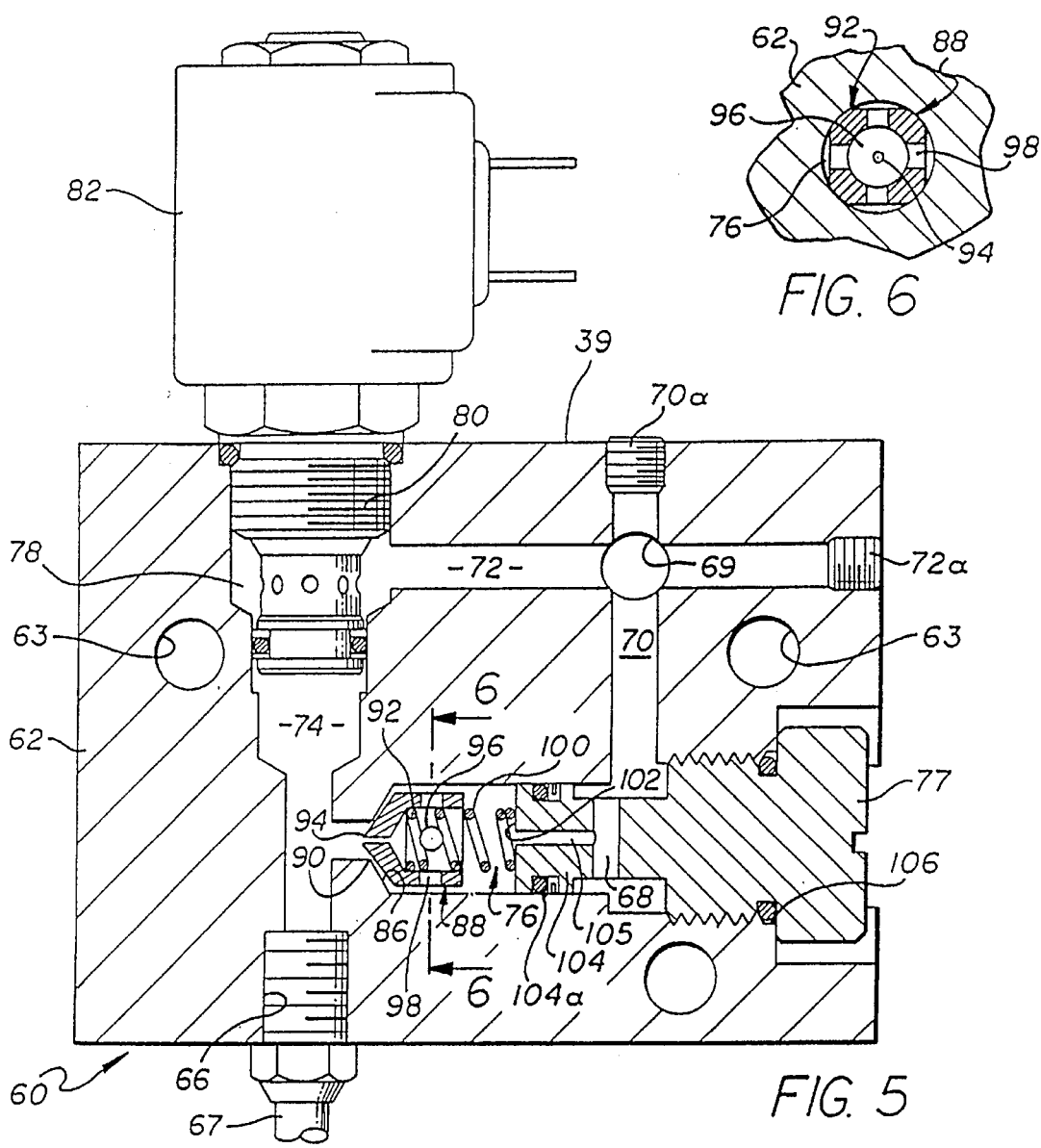
FIG. 6
FIG. 5
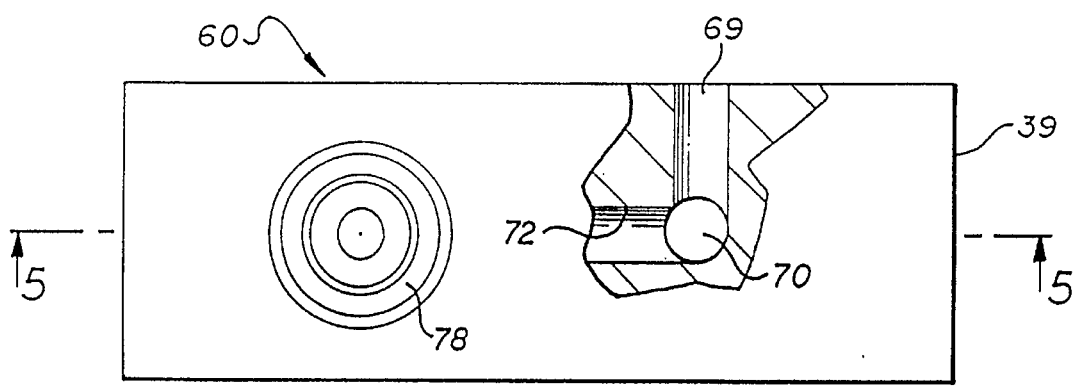
FIG. 4

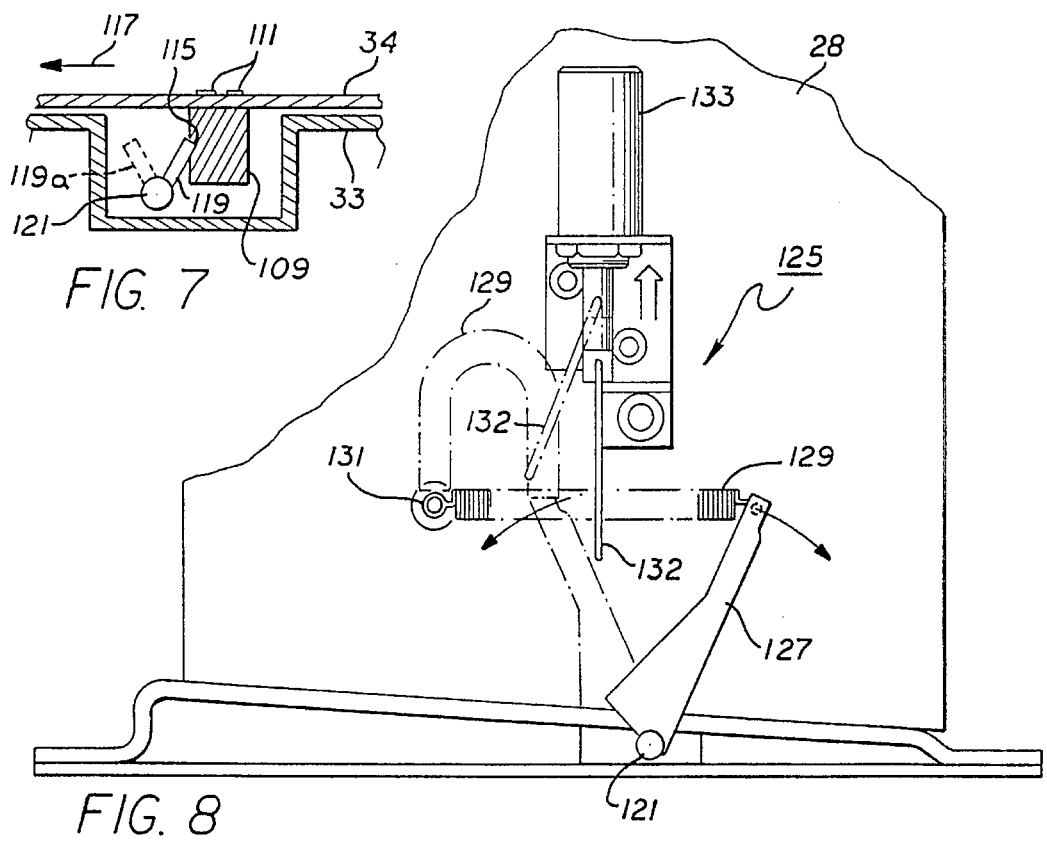
FIG. 7
FIG. 8
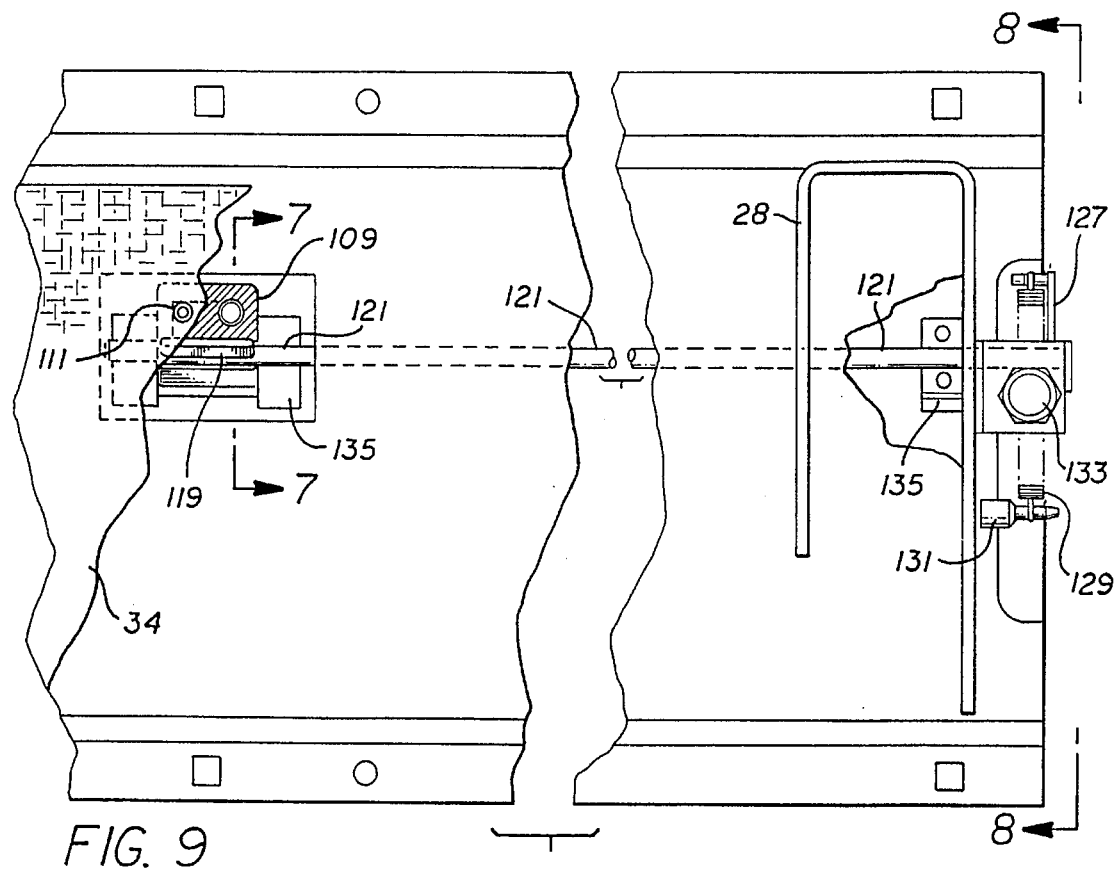
FIG. 9

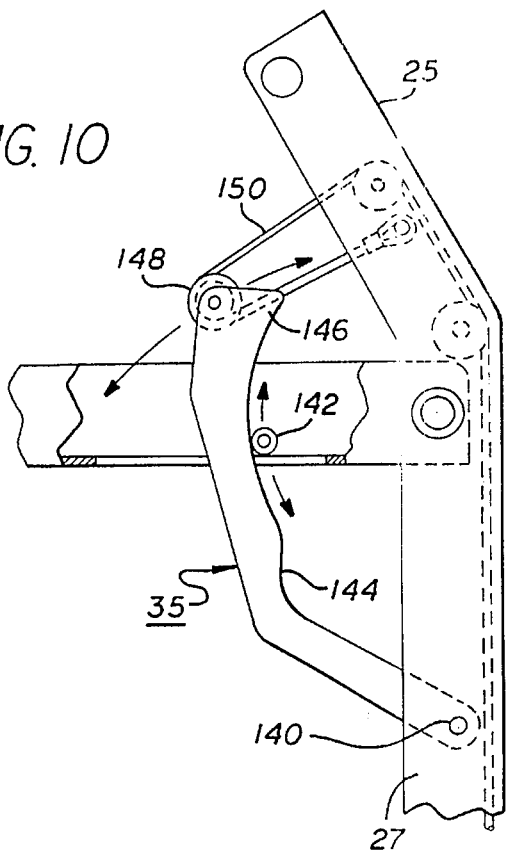
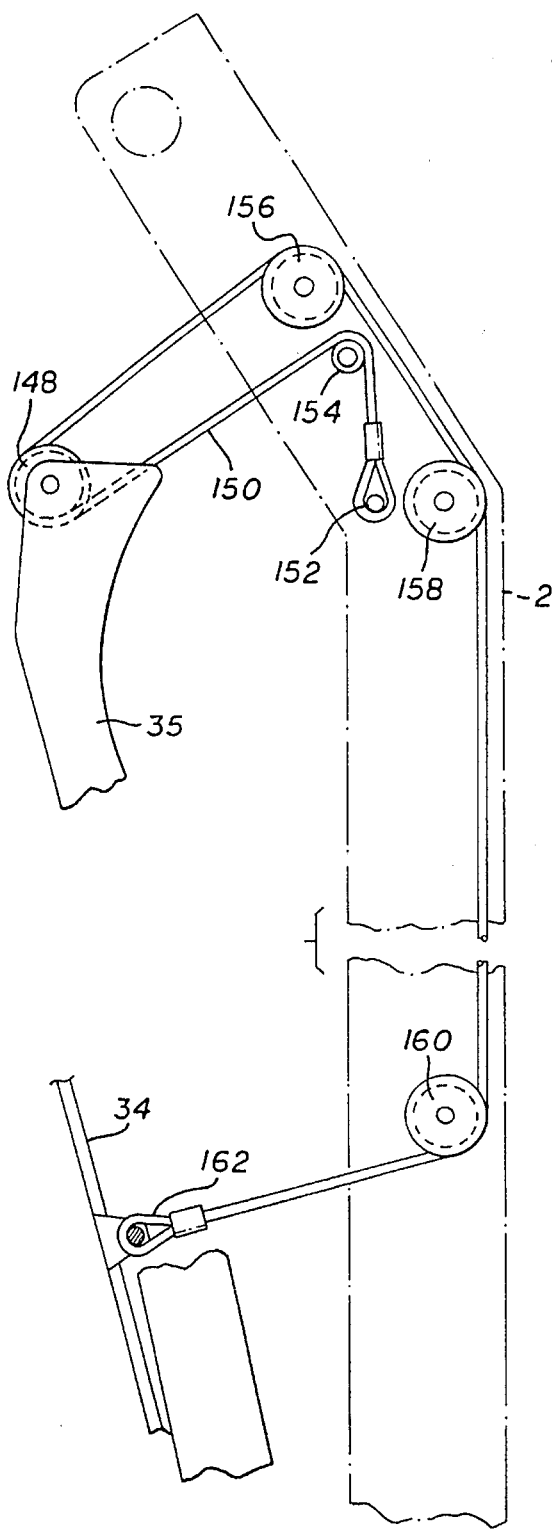
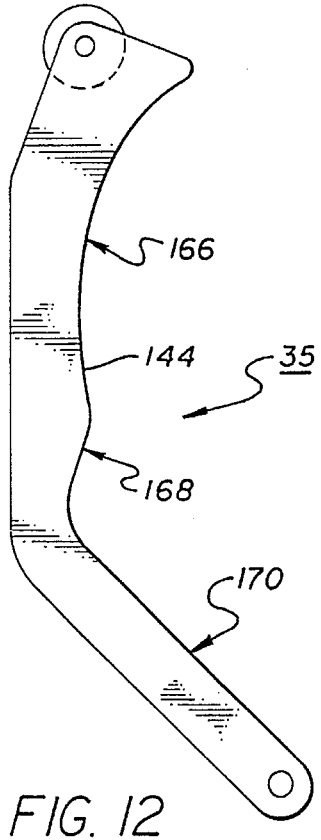
FIG. 10
FIG. 11
FIG. 12

LOCKING WHEELCHAIR LIFT

CROSS REFERENCE TO RELATED APPLICATIONS

This is a continuation of application Ser. No. 08/485,238 filed Jun. 6, 1995, now abandoned and entitled "Locking Wheelchair Lift", which is a continuation of application Ser. No. 08/114,774 filed Aug. 31, 1993, now U.S. Pat. No. 5,445,488 issued on Aug. 29, 1995, and entitled "Locking Wheelchair Lift", which is a continuation-in-part of application Ser. No. 07/920,796, filed on Jul. 28, 1992, entitled "Passenger Lifts Movable At Variable Speeds," now U.S. Pat. No. 5,308,215 issued May 3, 1994.

BRIEF SUMMARY OF THE INVENTION

1. Field of Invention

This invention relates generally to passenger or wheelchair lifts and, in particular, it relates to an improved wheelchair lift controlled for safe motion patterns.

2. Background of the Invention

A growing concern exists for persons who are handicapped or otherwise have limited mobility. That concern has given rise to a demand for improved structures to accommodate people in wheelchairs. Although various forms of wheelchairs exist and have helped handicapped persons considerably, their users still face many obstacles. For example, the development of safe, durable and economical lifts for transporting an occupied wheelchair in and out of a vehicle has presented one of the more challenging problems.

More recent wheelchair lifts have included mobile platforms to raise and lower passengers between a loading position (at ground level) and an entry position (at the vehicle's floor level). Currently, the convenience of such wheelchair lifts is enhanced by the unit collapsing for storage inside the vehicle.

Proposed wheelchair lifts have included a load platform that is driven through motion patterns to attain loading, entry and storage positions. Despite controlled patterns of motion, some problems still exist. For example, as the platform is moved through various positions or set for storage, there may exist a danger of undesirable motions or displacements in which the platform may move to undesirable positions, or even free fall through a space. As a result, persons may sustain injuries.

In one form of a wheelchair lift, two pairs of parallelogram structures accomplish different motion patterns to raise and lower the platform and collapse the unit for storage. To some extent, the parallelogram structures of each pair can move independently. Consequently, independent motion patterns may occur that can be troublesome or dangerous. Specifically, it is important that the unit is securely fixed in the stowed position. Also, it is important that the parallelogram structures move cooperatively to avoid spurious motion patterns that may be troublesome or dangerous. Generally, the present invention accomplishes such features.

SUMMARY OF THE INVENTION

In accordance with the present invention, a wheelchair lift is provided that can be securely stored and safely and reliably operated through phases of different motion patterns. In accordance with one embodiment of the invention, the wheelchair lift incorporates a mobile platform for receiving a wheelchair, a parallelogram mechanism to carry the platform, a hydraulic system for actuating the platform through the parallelogram mechanism and a control unit to accomplish different motion patterns.

As disclosed below, the parallelogram mechanism causes the platform to move in two different motion patterns, namely, a passenger transporting, horizontal pattern with "raise" and "lower" phases, and a storage motion pattern with "store" (swing up) and "deploy" (swing down) phases.

The parallelogram mechanism includes a cooperating pair of parallelogram structures on each side of the platform actuated to collapse and spread and thereby accomplish the distinct motion patterns. One set of similar large parallelogram structures (one on each side) pivot to accomplish the passenger, transporting raise-lower motion pattern. A set of smaller similar parallelogram structures pivot along with the large structures to swing the platform into a vertical storage position. Generally, in accordance herewith, elements are provided to maintain the desired motion patterns and securely fix the lift in the stowed position.

As the parallelogram mechanism carries the platform through the swing or store/deploy motion pattern, the large and small parallelogram structures are interlocked to accommodate the relative motions, yet engage the structures against deviate motions that could be dangerous.

In the stored position, the platform is locked through a hinged plate that also functions as an inward roll stop and as a bridge plate between the platform and the vehicle floor. When the platform is stored, the plate latches the lift against substantial displacement. When the platform is at the vehicle floor level, the plate extends horizontally to bridge the gap between the floor and the platform. As the platform is lowered, the plate is positioned vertically as a roll stop for the wheelchair.

These, as well as other features of the invention, will become apparent from the detailed description which follows, considered together with the appended drawings.

BRIEF DESCRIPTION OF THE DRAWINGS

An embodiment of the invention is illustrated in and by the following drawings in which like reference numerals indicate like parts and in which:

FIG. 2 is a side elevational view of a portion of the wheelchair lift shown in FIG. 1 illustrating different motion patterns thereof;

FIG. 3 is a hydraulic circuit diagram of the power system embodied in the wheelchair lift of FIG. 1;

FIG. 4 is a top plan view, partially cut away, of the flow control valve body embodied in the wheelchair lift of FIG. 1;

FIG. 5 is a cross-sectional view taken along line 5—5 of FIG. 4;

FIG. 6 is a sectional view taken along line 6—6 of FIG. 5;

FIG. 7 is a fragmentary perspective view illustrating a lock embodied in the wheelchair lift of FIG. 1;

FIG. 8 is a fragmentary side view of the lock structure for the lock as shown in FIG. 7;

FIG. 9 is a plan view of the structure of FIG. 8 illustrating the lock arrangement;

FIG. 10 is a fragmentary side elevation illustrating an actuating mechanism embodied in the wheelchair lift of FIG. 1;

FIG. 11 is a fragmentary side elevation somewhat similar to FIG. 10 showing a cable circuit;

FIG. 12 is a plan view of a cam actuator as embodied in the structures of FIGS. 10 and 11;

DETAILED DESCRIPTION OF THE PREFERRED EMBODIMENT

As required, a detailed illustrative embodiment of the invention is disclosed. However, it is to be understood that the invention is not limited in its application to the details of construction or the arrangement of parts as illustrated in the accompanying drawings and description, since the invention is capable of other embodiments and of being practiced or carried out in various ways.

Figure 1:
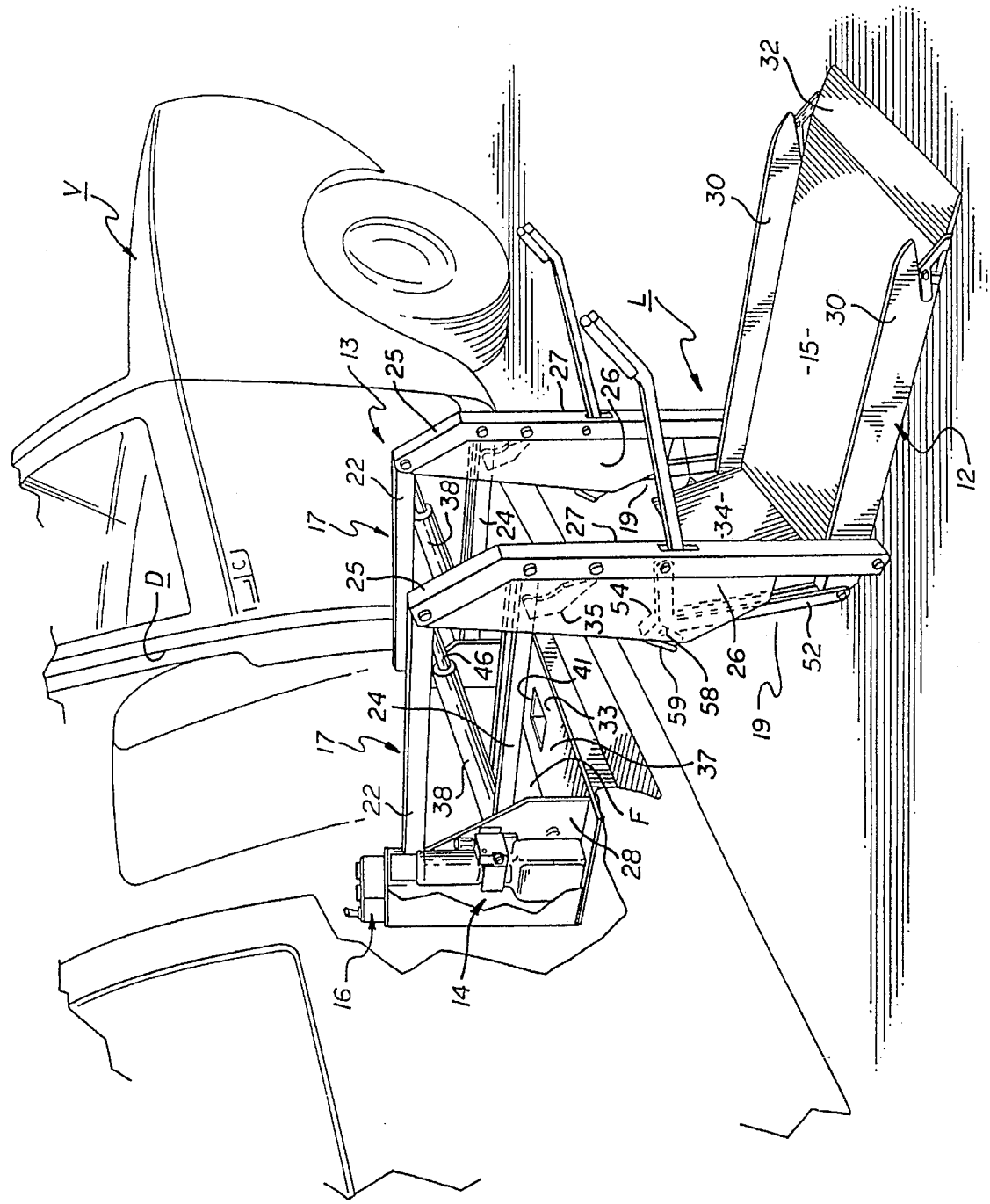
FIG. 1 is a perspective view illustrating a partial side view of a vehicle carrying a wheelchair lift in accordance with the present invention.

Referring now to FIG. 1, a side portion of a vehicle V is shown carrying a wheelchair lift L for raising a passenger in a wheelchair (not shown) from ground level to a position for entering or leaving the vehicle V. The wheelchair lift L may be secured to the rear, side or other appropriate opening of a vehicle. As illustrated in FIG. 1, the wheelchair lift L is installed at the floor F of the vehicle V to operate through a side doorway D.

Structurally, the lift L incorporates: a mobile platform 12 (lower right) for receiving a load such as a passenger in a wheelchair (not shown). A hydraulic system 14 (upper left) drives the platform through a parallelogram mechanism 13 as commanded by a control unit 16.

As indicated, the parallelogram mechanism 13 actuates the platform 12 in two different motion patterns, i.e., a passenger transporting, horizontal pattern with "raise" and "lower" phases, and a storage motion pattern with "store" (swing up) and "deploy" (swing down) phases. Generally, in accordance herewith, the lift is locked against devious motions that could cause annoyance, damage or personal injury. Specifically, the platform is locked in the stowed position to avoid drift that might occur. Also, in the swing motion pattern, cooperating parallelogram structures of the mechanisms are interlocked.

Considering the elements in greater detail, the platform 12 defines a generally rectangular, flat surface 15 that is pivotally connected to the vehicle V through the parallelogram mechanism 13. Structurally, the parallelogram mechanism 13 includes two sets of parallelogram structures, an upper set being larger than a smaller set. Specifically, components of the mechanism form upper, laterally spaced parallelogram structures 17 and lower parallelogram structures 19 (smaller).

The upper parallelogram structures 17, sometimes referred to as armatures, each include upper and lower parallel links 22 and 24 of channel stock. As shown, in (FIG. 1) the set of links 22 are horizontally aligned and each is vertically aligned with a cooperating link 24.

At the outboard ends (away from the vehicle V) the cooperating pairs of links 22 and 24 each are pivotally connected to a vertical channel arm 27. The upper ends 25 of the arms 27 are angled to extend offset from the vertical as illustrated. The offset ends 25, with the links 22 and 24, form three sides of the upper parallelogram structures 17. To form the fourth (inboard) side, a pair of armature brackets 28 are pivotally connected to the links 22 and 27. Note that a pair of panels 26 are mounted on the channel arms 27, illustrated only in FIG. 1. Thus, the pivotally swinging parallelogram structures 17 are defined.

In the operation of the lift L, a hydraulic ram or cylinder 38 operates in each of the upper parallelogram structures 17 to open and close the parallelogram (see FIG. 2). Somewhat independently, the lower parallelogram structures 19 retain an open configuration during the transporting raise-lower motion pattern, but collapse or close during the storage motion pattern as a result of forceful engagement with the upper parallelogram structure 17. As described in detail below, and in accordance herewith, an interlock is provided between the parallelogram structures 17 and 19 during the storage motion pattern.

The movement of the upper parallelogram structures 17, accomplished by the hydraulic cylinders 38, also positions a roll stop or bridge plate 34 hinged to the inboard edge of the platform 12. As described in detail below, the bridge plate 34 performs several functions, specifically, bridge, roll stop and latch.

The bridge plate 34 is moved by the upper parallelogram structures 17 as a result of displacement of compound cams 35 (FIG. 1, adjacent end 25, shown in phantom). As described below, the cams 35 position the bridge plate 34 through a cable connection.

Generally, as treated in greater detail below, the bridge plate 34 latches the platform 12 to the vehicle floor F through the base 33 (FIG. 1) rigidly affixed near the bottom of the doorway D. Note the rectangular well or recess 41 in the base 33 engagingly receives a latch member carried on the underside of the bridge plate 34 as described below. A release mechanism is mounted on the armature bracket 28 (FIG. 1, opposite side, not shown) to release the latch.

As shown in FIG. 1, the bridge plate 34 is raised as a roll stop or barrier to confine the transported wheelchair. For a similar purpose, elongated side risers or guide rails 30 (lower right) are fixed on each side of the platform 12. At the outboard or front end of the platform 12, a pivotal roll stop or end flap 32 is fixed adjacent to the surface 15. As also seen in FIG. 2, for boarding the platform from ground level, the flap 32 rotates from a somewhat horizontal ramp position to a vertical barrier or roll stop position. Various mechanisms are known for positioning the end flap 32, depending on the location of the platform 12.

In FIG. 2, the wheelchair lift L is illustrated in three positions: stowed position S (phantom lines) entry position E (solid lines) and lowered loading position G (phantom lines). As generally indicated above, a pair of spaced apart hydraulic cylinders 38, each with an axially aligned piston rod 46, drive the parallelogram mechanism 13 to a closed configuration. That is, remote from the cylinders 38, each piston rod 46 is pivotally connected to one of the parallel links 22 at the points of connection to the channel arms 27. The opposed ends of each cylinder 38 are pivotally connected to the points of connection of lower parallel links 24 with one of the armature brackets 28.

The hydraulic system 14 also includes a pump assembly 36 (FIG. 2) and is affixed to the outside of the rear armature bracket 28 for support. A suitable pump assembly 36 such as the Monarch M-259 manufactured by Fluid-Pack, International Ltd., London, Ontario may be used. The assembly 36 includes a pump 40 to actuate the cylinders 38, a motor 42 driving the pump and a reservoir 44 to supply and accept fluid to and from the hydraulic drive system 14. Fluid passages (not shown in FIG. 2) accommodate fluid flow between the assembly 36 and the cylinders 38 in forward and reverse directions. It should be noted that the lift 10 is raised under power but will lower under the force of its own weight.

Consider the motion patterns in greater detail. From the ground position G, driven by the cylinder rods 46, the parallelogram structures 17 swing upwardly until the platform 12 is level with the floor F of the vehicle V (position E). Note that parallelogram structures 17 maintain the platform 12 in a substantially horizontal position as it is raised or lowered between ground level and the vehicle floor. During such motion, the smaller lower parallelogram structures 19 are unchanged in an open configuration.

The storage or "stow" motion pattern in which the platform 12 pivots from the entry position E to the vertical position S also is shown in FIG. 2. The platform 12 pivots between the horizontal loading position E and the vertical storage position S by the cooperative motions of the upper and lower parallelogram structures 17 and 19. During the motion, each of the cooperating structures 17 and 19 are interlocked for relative sliding motion.

Each of the lower parallelogram structures 19 include pivotally interconnected bars 52 and 54 also connected to the platform 12 and the channel arm 27. Again, note that as the parallelogram structures 19 pivotally swing the platform 12 upward, the structures 19 are locked to the links 24 through a saddle block assembly 58 mounted at the pivotal junction of the bars 52 and 54. A headed stud 59, of somewhat mushroom configuration fixed on each of the assemblies 58, is received in a slot as described below to slidingly engage an aligned link 24 (see position E). The locking engagements force the smaller swing-motion parallelograms structures 19 to move somewhat synchronously with the larger parallelogram structures 17.

To consider the overall operations in greater detail, assume a wheelchair passenger wishes to exit the vehicle V. The operator selects the "deploy" pattern using the control unit 16 (FIG. 1). This actuates the hydraulic system 14 to open a valve (disclosed below) allowing the platform 12 to swing from the substantially vertical stowed position S to the horizontal entry position E. The wheelchair is rolled onto the platform 12 and when the operator selects the "lower" motion pattern, the platform 12, remaining substantially horizontal, eases down to the position G. After the wheelchair is off the platform 12, the control functions are reversed to move the platform 12, powered through the raise and stow patterns, ultimately returning to the storage position S.

Recapitulating to some extent, the lift has four distinct motion phases of two patterns as set forth below. For each phase, there is a different hydraulic mode.

| Pattern Phases | Movement | Flow | Operation |
| --- | --- | --- | --- |
| Storage Pattern, deploy | S to E | To Reservoir | Swing down from storage position |
| Transport Pattern, lower | E to G | To Reservoir | Horizontal movement to ground |
| Transport pattern, raise | G to E | To Cylinder (Power) | Horizontal movement to vehicle |
| Storage pattern, store | E to S | To Cylinder (Power) | Swing to storage position |

Turning now to the hydraulics, control of the speed at which the passenger lift moves through the different patterns resides in a valve body 39 (FIG. 2) which is part of the pump assembly 36. In the disclosed embodiment, a lightweight aluminum block is machined or otherwise formed to define multiple passageways and receive control members. FIG. 3 illustrates the hydraulic circuit using substantially standard symbology.

Generally, a hydraulic control 41 represents a unitary block body that is coupled between the cylinders 38 (FIGS. 2 and 3) and the pump 40 which, in turn, is connected to the reservoir 44. The pump 40 is active during pattern phases to store and raise the lift 10.

The control 41 defines three channels, represented in FIG. 3 by passages 55, 56 and 57. The passage 55 defines an orifice 55a and contains a valve 55b. Similarly, the passage 56 defines an orifice 56a and contains a valve 56b. The passage 57 is unobstructed but carries a valve 57b. The functions of the passages are summarized as follows:

| Passage | Flow | Operation (Valve Open) | Function |
| --- | --- | --- | --- |
| 55 | Left | Movement E to S (store) | Present small orifice |
| 56 | Right | Movement S to E (deploy) | Present large orifice |
| 57 | Bidirectional | Movement G to E (raise) and E to G (lower) | Accommodate lifting and lowering operation |

The restricted passages 55 and 56 effect lift movement at similar reduced speeds, the orifice sizes compensating for the weight of the lift accounting for movement during "deploy" while the pump drives the lift during "store".

Reference now will be made to FIGS. 4 and 5 to consider the composite integrated structure of the control 37 as embodied in a block 60. Note that the block 60 is affixed in the hydraulic system 16 by screws (not shown) extending through boxes 63 (FIG. 5). Generally, the block 60 accommodates fluid flow in multiple paths as described above to enable the lift to move at select speeds.

Considering the structure of the block 39 (FIG. 5) in greater detail, a staged bore 74 (left) extends through the block 39 from top to bottom. The top portion of the staged bore 74 forms a cavity 78 configured to receive a normally closed spool valve 80 actuated by a solenoid 82.

Transverse to the bore 74, an upper bore 72 extends from the cavity 78 to the right-hand side of the block 39 as shown, passing through a bore 69 at a right angle. A plug 72a seals the end of the bore 72 opposite the cavity 78.

Below the bore 72 and transverse to the bore 74, a staged bore 76 extends from a region proximate the lower end of bore 74 to the right-hand side of block 39. The orifice of the bore 76 is closed by a threaded plug 77 sealed by an "O" ring 106. The stage of bore 76, proximate to the end that connects with bore 74, forms a tapered seat 86 for a normally seated movable member or orifice 88. The movable unidirectional flow, attenuating orifice 88, has a tapered section 90 to abut the seat 86 when seated (left).

Referring additionally to FIG. 6, the movable orifice 88 defines a substantially square outside body section 92 (FIG. 6). The diagonal of the body section 92 is smaller than the diameter of the bore 76, permitting the movable orifice 88 to shift freely within the bore. The tapered section 90 defines a relatively small orifice 94 while the body section 92 has a flow passage 96 therethrough and lateral perforations 98 through each of its four sides. Accordingly, the flow passage 96 is in fluid communication with the gaps formed between the sides of the body section 92 and the adjacent surface of the bore 76.

The movable orifice 88 (FIG. 5) is biased against the seat 86 by a coil spring 100. One end of the spring 100 is recessed in the flow passage 96. The other end of the spring 100 abuts a contact surface 102 of a cartridge 104 set in the bore 76. An O-ring 104A seals the cartridge 104 in the bore 76.

A relatively large orifice 105, through the portion of the cartridge proximate the contact surface, intersects with a transverse bore 68 and together they connect the bore 76 to bore 70. The relatively small orifice 94 in movable orifice 88 has a diameter that is smaller than the relatively large orifice 105 in the cartridge 104. These orifices coincide to the representative orifices 55a and 56a, respectively, of FIG. 3.

The bore 70, disposed parallel to the bore 74, extends from the top of block 39, intersects the bore 72 and terminates in the mid-portion of a bore 76, connecting the bores 72 and 76. A plug 70a seals the entry of the bore 70 opposite the bore 76. A bore 69 (coupled to the pump 40) lies orthogonal to the plane formed by the bores 70 and 72. The bore 69 extends from the intersection of bores 70 and 72 to the surface of the block 39.

Threads on the surface of the lower end of bore 74 form a cylinder port 66 that threadably couples with a cylinder line 67 to connect the block 39 with the cylinders 38. As indicated above, the surface of the end of the bore 69 (opposite the intersection with the bores 70 and 72) connects the block 39 to the pump assembly 36.

Turning now to the operation of the flow control means, one fluid path is from the pump port 69 through the bores 72 and 74, then to the cylinder port 66. The path accommodates flow to raise and lower the platform 12 between positions G and E. It is represented by the passage 57 in FIG. 3.

A second fluid path is from the pump port 69 through bores 70, 76, and a portion of the bore 74 to the cylinder port 66. The path accommodates flow attendant movement between the positions E and S. The path is represented in FIG. 3 by the two paths 55 and 56 passing fluid in two directions, one more restricted than the other. As indicated above, the stowing pattern is powered and, consequently, flow is more restricted to accomplish the desired speed of motion.

To summarize, consider the distinct motion patterns of deploying the lift L, raising and lowering (with or without a passenger) and storing the lift. For deployment, the spool valve 80 is closed. The fluid is subjected to relatively smaller pressure as it travels (left to right) from the cylinder port 66 to the pump port 69 forced by the weight of the lift L. As the fluid enters the bore 76, the movable orifice 88 is unseated, permitting the fluid to pass around and through the movable orifice without substantial obstruction. However, the fluid does encounter the relatively large control orifice 105 for some reduced flow.

When the platform 12 is to be stored or stowed, the spool valve 80 is closed. However, by action of the pump 40, the fluid is subjected to relatively greater pressure as it travels in the direction from the pump port 69 to cylinder port 66. The fluid flows through the bore 70 into the transverse bore 68 and then through the relatively large orifice 105, causing some reduction in the flow rate. Then, the fluid encounters the movable orifice 86 in its seated position so that flow is substantially obstructed to accomplish the desired rate and motion speed as fluid emerges into the bore 74 and passes to the cylinders.

The orifice sizes are selected so that final flow rates, and consequently the rates of platform movement during both deployment and storage, are substantially equal. The operation requires that the effective orifice encountered by the fluid subjected to the higher pressure difference (during storage) be smaller than the effective orifice encountered by the fluid subjected to the lower pressure difference (during deployment).

In view of the above description of the motion patterns for the lift L, consideration now will be given to certain structures and operations as treated above only in a general manner. Accordingly, assume that the lift L is in the stowed position S (FIG. 2) collapsed within the vehicle V. So positioned, if free, the lift L would drop to the entry position E under the force of gravity. However, it is restrained by the extended piston rods 46 of the cylinders 38. The problem is that hydraulic systems are susceptible to leakage, particularly over extended time intervals. Consequently, fluid tends to pass out of the cylinders 38, allowing the lift L to drift down. Typically, at some point, the lift L will engage an interior surface of the vehicle V. Rattles and marred surfaces are often the result.

If the lift L abuts a door of the vehicle V, it may impede the operation of the door. Thus, a need exists to fasten or lock the lift L in the stowed position S.

As generally indicated above, the lift L is locked in position by latching the bridge plate 34 (FIG. 1) to the base 33. Specifically, when the lift L is in the stowed position S, the bridge plate 34 lies in horizontal facing relationship with the base 33. The movements of the bridge plate 34 are described in greater detail below. However, generally, a lock block 109 (FIG. 7), affixed to the bottom of the bridge plate 34 drops into the recess 41 in the base 33 fixing the bridge plate 34 to the base 33 and accordingly locking the lift L to the vehicle V. Detailed parts and operations of the structure will now be treated with reference to FIGS. 7, 8 and 9.

As shown in FIG. 7, the lock block 109 is affixed to the underside of the bridge plate 34 by a set of fasteners 111. Note that the lock block 109 may be made of a low friction, rigid, plastic material and is of generally parallelepiped configuration, however, defining a horizontal detent 115 at the surface outboard of the vehicle V.

FIG. 7 illustrates the mechanism with the lift L in the stowed position S. Accordingly, as the lift L tends to drift, the motion would be as indicated by an arrow 117 to the left as depicted. However, such movement is checked by a latch bar 119 received in the detent 115.

The latch bar 119 is carried on an elongate rotary shaft or rod 121 that is actuated as disclosed below to pivot the latch bar 119 to a disengaged ramp position as illustrated in phantom by the latch bar 119a. Accordingly, when released, the rod 121 is revolved in a counter clockwise direction and the bridge plate 34 is free to move to the left, as indicated by the arrow 117, the motion being accommodated by the lock block 109 simply riding over the latch bar 119. Thus, acting through the bridge plate 34, the platform 12, and indeed the entire lift L is locked in the stowed position S (FIG. 2) until the latch bar 119 is released.

As indicated, the mechanism for controlling the latch bar 119 is disclosed in greater detail below along with the somewhat related mechanism for lifting and lowering the bridge plate 34 as it is carried through the different positions by the platform 12.

The shaft or rod 121, as shown in FIG. 7, extends laterally across the bridge plate 34 (FIG. 9) to be mounted external of the bracket 28 (FIG. 1). The exterior of the bracket 28 is shown in FIG. 8 along with the mechanism 125 for controlling the rod 121.

At the base of the bracket 28, the rod 121 carries a crank arm 127, the upper end of which is coupled by a coil spring 129 to holding post 131. Functionally, the coil spring 129 acts as a rigid column holding the crank arm 127 positioned to the right as illustrated in FIG. 8. Accordingly, the latch bar 119 (FIG. 7) is held in locking engagement with the lock block 109. To release the latch bar 119, the coil spring 129 is "broken", simply bent to accommodate a leftward pivotal motion by the crank arm 127. The bending or "breaking" of the spring 129 allows it to be driven to a loop, as shown in phantom, and is accomplished by a wire loop 132 affixed to the armature of a solenoid 133. The solenoid 133 is pulsed when the control unit 16 is actuated to initiate lowering the lift from the stowed position S. Accordingly, when the solenoid 133 is energized, its armature raises the wire loop 132 "breaking" the spring 129 into an inverted "U"-shaped configuration. Consequently, the crank arm 127 swings to the left (as illustrated) revolving the shaft 121 to disengage the latch bar 119, moving it into a ramp position as indicated by the phantom bar 119a (FIG. 7).

Note that the rotary motion of the shaft 121 is accommodated by bearing mounts 135 as illustrated in FIG. 9. Also, it is noteworthy that, if necessary, the release can be manually actuated simply by manually "breaking" the spring 129 (FIG. 8) to disengage the latch bar 119 (FIG. 7). Accordingly, an effective and convenient locking arrangement is provided, acting effectively through the bridge plate 34 to fix the lift L rigidly in the stowed position S.

As indicated above, the bridge plate 34 not only serves as a locking element and a bridge ramp, but additionally functions as an inward roll stop. Consequently, the bridge plate 34 (FIG. 1) is variously positioned between substantially vertical and substantially horizontal positions as the lift is raised and lowered. Generally, as indicated above, the operation is accomplished by a pair of similar cams 35 (FIG. 1) driven by the upper parallelograms 17 to actuate cables coupled to the bridge plate 34.

The motion of the bridge plate 34 is meaningful in relation to the platform surface 15. When the platform 12 is lowered and the platform surface 15 is substantially horizontal, as depicted in FIG. 1, the bridge plate 34 is somewhat vertical functioning as a roll stop. The bridge plate 34 remains in the somewhat vertical position during the raise-lower motion pattern between the positions G and E. However, at the end of that motion pattern, the bridge plate 34 swings down to a parallel position substantially flush with the platform surface 15, bridging the space to the base 33. Thus, the wheelchair is afforded a smooth surface into the vehicle V.

During the stow motion pattern, when the platform 12 moves from a substantially horizontal position to a substantially vertical position, the bridge plate 34 again becomes substantially perpendicular to the surface 15. That is, when the platform 12 is vertical in the stowed position S, the bridge plate 34 is substantially horizontal functioning as a latch member, as described above, to accomplish the positions of the bridge plate 34, the cam 35, actuated by the upper parallelogram 17, in turn, actuates a cable connected to the bridge plate 34. Again, similar cams 35 with cables are provided on each side of the lift mounted on the channel arms 27.

As illustrated in FIG. 10, the cam 35 is pivotally mounted on a bearing pin 140 at an upward location in the channel arm 27. Thus, a cam follower 142 rides over the compound cam edge 144 to variously position its top end 146 which carries a pulley 148. A cable 150 rides on the pulley 148 with an upper end anchored in the end 25 of the channel arm 27. The opposed end of the cable 150 threads through a series of pulleys, as illustrated in FIG. 11, and is connected to the bridge plate 34.

As illustrated in FIG. 11, the cable 150 is anchored to the channel arm 27 by a stud 152. The cable then extends from the stud 152 over an idler 154, the pulley 148 and a pair of pulleys 156 and 158 to extend downwardly within the channel arm 27. At a location just above the bridge plate 34, the cable 150 is received over another pulley 160 before passing to an attachment 162 on the bridge plate 34.

The cam edge 144 (FIG. 12) defines three distinct cam drives. The uppermost arcuate section 166 engages the cam follower 142 to be swung out from the channel arm 27, raising the bridge plate 34 to the position illustrated in FIG. 1. As the platform 12 is raised, the collapsing upper parallelogram 17 is accommodated by the arcuate section 166 of the cam holding the bridge plate 34 somewhat vertical until the section 168 engages the cam follower 142 to lower the bridge plate 34. With further upward movement by the lift L, the last section 170 of the cam becomes active to set the bridge plate 34 somewhat perpendicular to the surface 15. Accordingly, the bridge plate 34 is horizontal for the locking engagement as described above.

Recapitulating to some extent, while the lift is locked in the stowed position S (FIG. 2) when it is released and the hydraulic cylinders 38 are relieved, the lift swings downward, as described above, positioning the platform 12 substantially horizontal at the entry position E by the cooperative action of the upper and lower parallelogram structures 17 and 19. However, the two parallelogram structures are somewhat independent. As a consequence, the upper parallelogram structure 17 may begin to swing down while the lower parallelogram structure 17 remains somewhat collapsed. As a consequence, a danger exists that the upper parallelogram structure 17 may substantially open with the lower parallelogram structure 19 remaining closed up to some point at which the lower parallelogram structure opens, allowing the platform P a pivotal free fall. Essentially, in accordance herewith, a need is recognized to interlock the upper and lower parallelograms 17 and 19 so as to force cooperative motions as the lift L moves between the positions S and E. Essentially, the locking engagement is accomplished by the saddle block 58 (FIG. 2) being engaged to the parallel link 24 during the cooperative pivotal motion pattern.

Figure 13:
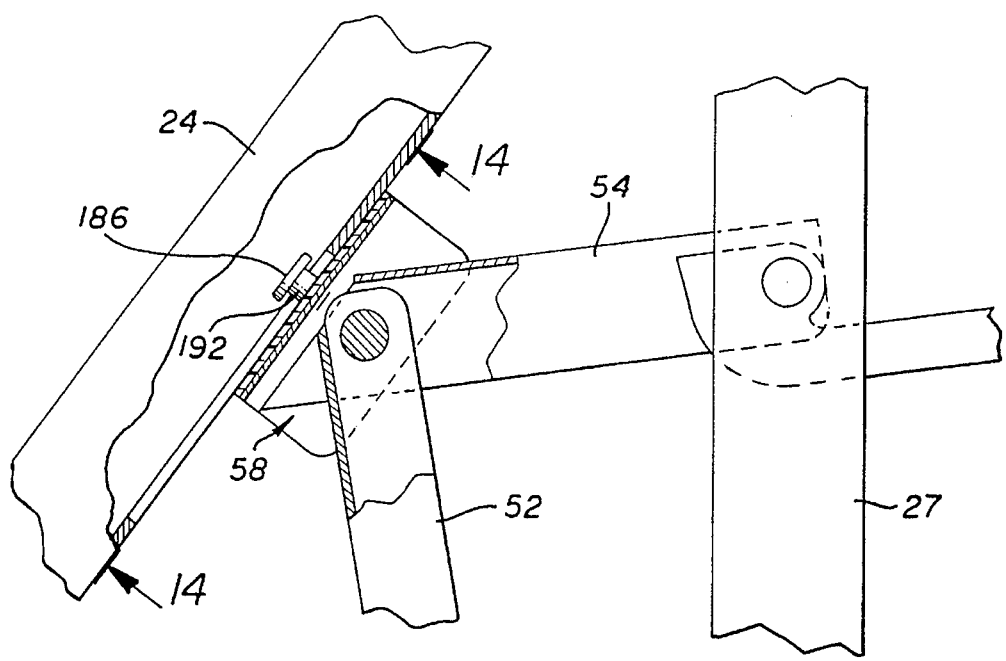
FIG. 13 is a fragmentary side elevation of a locking mechanism as embodied in the lift of FIG. 1.
Figure 14:
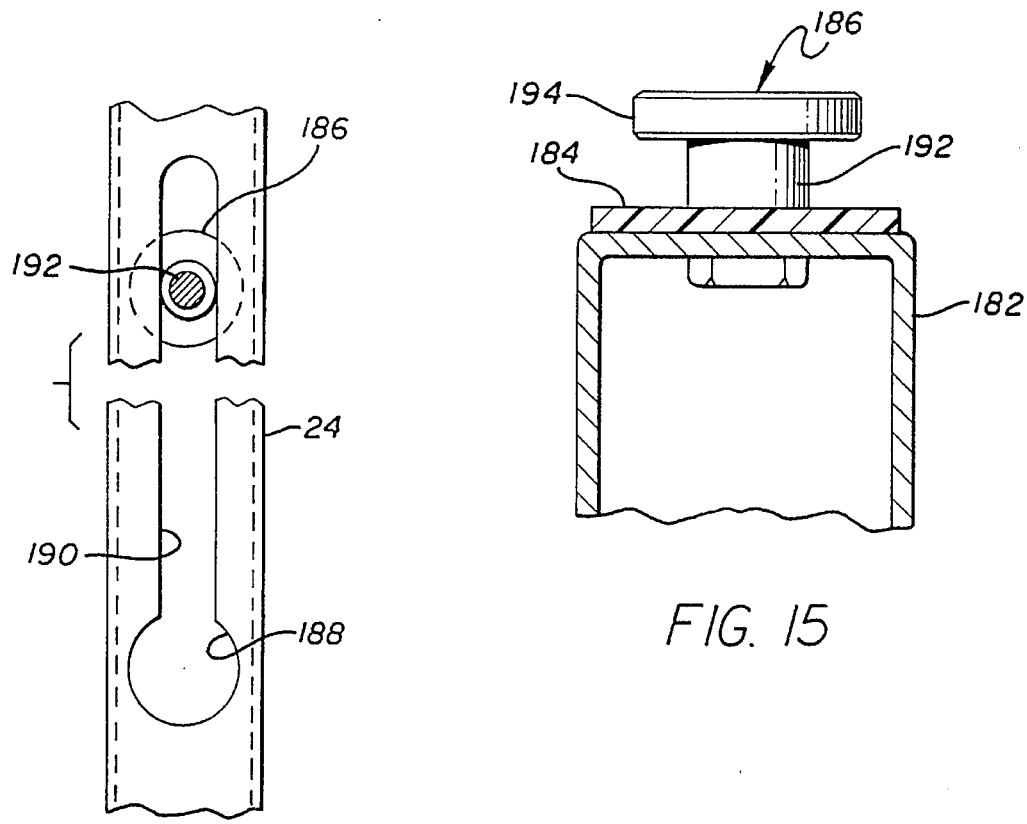
FIG. 14 is a sectional view taken along line 14—14 of FIG. 13.
Figure 15:
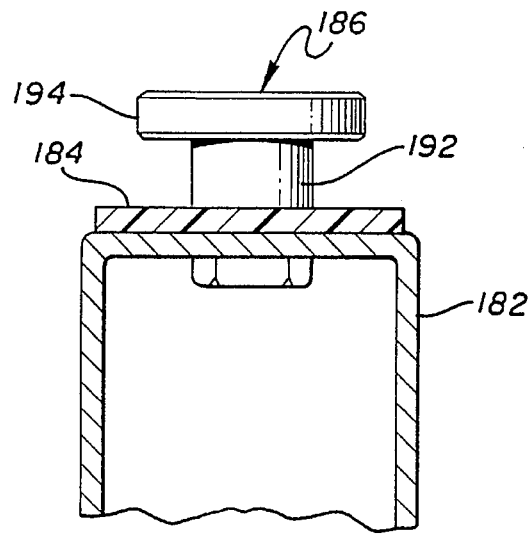
FIG. 15 is a sectional view taken through the structure of FIG. 14.

FIG. 13 shows the saddle block assembly 58 somewhat enlarged form along with the supporting pivot bars 52 and 54 and the parallel link 24. The sectional view of FIG. 14 illustrates the selective locked engagement between the saddle lock assembly 58 and the parallel link 24 as now will be considered in greater detail.

As indicated above, the saddle block assembly 58 includes a yoke section 182 of channel configuration with a sliding shoe 184 of frictionless plastic set to engage the parallel link 24 (FIG. 13). Extending from the yoke section 182 through the shoe 84 is a capped stud 186 of a somewhat "mushroom" configuration. For mating engagement with the stud 186, a circular opening 188 is provided in the parallel link 24 aligned with the stud 186 when the lift is in the entry position E as illustrated in FIG. 2. Extending from the opening 188, parallel with the link 24, is a slot 190 to accommodate the short shaft 192 of the stud 186 with the head 194 inside the slot 190. Accordingly, the head 194 of the stud 186 enters the opening 188 as the lift is raised into the entry position E. With continued raising of the lift L, the lower parallelogram 19 is locked to the upper parallelogram 17. Specifically, the stud 186 is slidingly engaged with the link 24, locking the saddle block assembly in sliding engagement. Accordingly, the two parallelogram structures 17 and 19 move in a cooperative action as the lift L moves between the entry position E and the stowed position S. Accordingly, when the lift is released from the stowed position S and the upper parallelogram 17 begins to swing outwardly, the lower parallelogram structure 19 is forced to open, allowing the platform 12 to swing down. As explained above, when the platform 12 attains the entry position, the stud 86 allows withdrawal of the saddle block assembly 58, permitting the two parallelogram structures 17 and 19 to separate and accommodate the independent transporting platform motion patterns.

In view of the above, it is apparent that the structure mechanisms as described accommodate desired and safe motion patterns as a result of interrelated structures. As indicated, various departures from the structures are possible and will be apparent to persons of skill in the art. However, the importance herewith, the scope hereof is deemed to be appropriately determined with reference primarily to the claims as set forth below.

What is claimed is:

1. A wheelchair lift for transporting a passenger in relation to a vehicle and including motion patterns between a loading position, an entry position and a stowed position, said lift comprising:

a platform structure for carrying a passenger; and a pivotal mechanism including at least two pairs of parallelogram structures linked for distinct pivotal motion patterns, said parallelogram structures being affixed to said platform structure and adapted to be affixed to said vehicle for moving said platform structure between said loading position, said entry position and said stowed position, each of said pairs of parallelogram structures comprising an upper parallelogram structure and a lower parallelogram structure, each of said upper and lower parallelogram structures comprising two elongated structures, said upper and said lower parallelogram structures being releasably interlocked in sliding engagement while said platform structure moves between selected of said positions.

2. A wheelchair lift according to claim 1 wherein said pivotal mechanism includes at least one hydraulic ram for closing said parallelogram structures.

3. A wheelchair lift according to claim 1 wherein within one of said pairs of said parallelogram structures said elongated structures of said upper and lower parallelogram structures are releasably interlocked with each other.

4. A wheelchair lift for transporting a passenger in relation to a vehicle and including motion patterns between a loading position, an entry position and a stowed position, said lift comprising:

a platform structure for carrying a passenger; and a pivotal mechanism including at least two pairs of parallelogram structures linked for distinct pivotal motion patterns, said parallelogram structures being affixed to said platform structure and adapted to be affixed to said vehicle for moving said platform structure between said loading position, said entry position and said stowed position, each of said pairs of parallelogram structures comprising an upper parallelogram structure and a lower parallelogram structure, each of said upper and lower parallelogram structures comprising two elongated structures, wherein said upper and said lower parallelogram structures are in releasably interlocking sliding engagement while said platform structure moves between said entry and said stowed positions.

5. A wheelchair lift according to claim 4 wherein within each of said pairs of parallelogram structures a stud affixed to one of said elongated structures of one parallelogram structure releasably interlocks a slot defined in one of said elongated structures of the other parallelogram structure.

6. A wheelchair lift for transporting a passenger in relation to a vehicle and including motion patterns between a loading position, an entry position and a stowed position, said lift comprising:

a platform structure for carrying a passenger; and a pivotal mechanism including at least two pairs of parallelogram structures linked for distinct pivotal motion patterns, said parallelogram structures being affixed to said platform structure and adapted to be affixed to said vehicle for moving said platform structure between said loading position, said entry position and said stowed position, each of said pairs of parallelogram structures comprising an upper parallelogram structure and a lower parallelogram structure, each of said upper and lower parallelogram structures comprising two elongated structures, said upper and said lower parallelogram structures being releasably interlocked in alignment while said platform structure moves between selected of said positions, wherein a stud affixed to said lower parallelogram structure releasably interlocks a slot defined in said upper parallelogram structure.

7. A wheelchair lift for transporting a passenger to ingress and egress in relation to a vehicle substantially in a direction and including motion patterns between a loading position, an entry position and a stowed position, said lift comprising:

a platform structure for carrying a passenger;

a pivotal mechanism attached to said platform structure and adapted to be affixed to said vehicle for moving said platform structure between said loading position, said entry position and said stowed position, said pivotal mechanism comprising at least one parallelogram structure defining a plane substantially parallel with said direction of ingress and egress;

a plate pivotally affixed to said platform structure contiguous to said vehicle; and cam mechanism actuated by said pivotal mechanism to variously raise and lower said plate in accordance with the position of said platform structure.

8. A wheelchair lift according to claim 7 wherein said cam mechanism comprises a cable for connecting said cam mechanism to said plate.

9. A wheelchair lift according to claim 8 wherein said cable extends through one of said parallelogram structures.

* * * * *